United States Patent
Hoffmann et al.

(10) Patent No.: US 10,662,537 B2
(45) Date of Patent: May 26, 2020

(54) GRAPHENE AND THE PRODUCTION OF GRAPHENE

(71) Applicant: FRAUNHOFER-GESELLSCHAFT ZUR FÖDERUNG DER ANGEWANDTEN FORSCHUNG E.V., Munich (DE)

(72) Inventors: René Hoffmann, Freiburg (DE); Christoph E. Nebel, Freiburg (DE); Sarah Roscher, Freiburg (DE)

(73) Assignee: Fraunhofer-Gesellschaft Zur Förderung Der Angewandten Forschung E.V., Munich (DE)

( * ) Notice: Subject to any disclaimer, the term of this patent is extended or adjusted under 35 U.S.C. 154(b) by 91 days.

(21) Appl. No.: 15/642,086

(22) Filed: Jul. 5, 2017

(65) Prior Publication Data

US 2017/0298523 A1    Oct. 19, 2017

Related U.S. Application Data

(63) Continuation of application No. PCT/EP2016/073451, filed on Sep. 30, 2016.

(30) Foreign Application Priority Data

Feb. 12, 2016    (DE) .................. 10 2016 202 202

(51) Int. Cl.
| | |
|---|---|
| C25B 1/00 | (2006.01) |
| C01B 32/19 | (2017.01) |
| C25B 9/08 | (2006.01) |
| C25B 11/12 | (2006.01) |
| C25B 9/16 | (2006.01) |

(Continued)

(52) U.S. Cl.
CPC ............... C25B 1/00 (2013.01); C01B 32/19 (2017.08); C25B 9/08 (2013.01); C25B 9/166 (2013.01); C25B 11/12 (2013.01); H01M 4/587 (2013.01); H01M 4/625 (2013.01); B82Y 30/00 (2013.01); B82Y 40/00 (2013.01); C01B 2204/04 (2013.01); C01P 2002/82 (2013.01); C01P 2004/03 (2013.01); C01P 2004/24 (2013.01);

(Continued)

(58) Field of Classification Search
CPC .................................. C25B 1/00; C01B 32/19
See application file for complete search history.

(56) References Cited

U.S. PATENT DOCUMENTS

| | | |
|---|---|---|
| 5,503,717 A | 4/1996 | Kang et al. |
| 2002/0008031 A1 | 1/2002 | Barsukov et al. |

(Continued)

FOREIGN PATENT DOCUMENTS

| | | |
|---|---|---|
| CN | 103693638 | 4/2014 |
| EP | 2878709 | 6/2015 |

(Continued)

OTHER PUBLICATIONS

Bang et al., "Preparation of graphene with few defects using expanded graphite and rose bengal," J. Mater. Chem, 2012, 22: 4806-4810.

(Continued)

*Primary Examiner* — Nicholas A Smith
(74) *Attorney, Agent, or Firm* — Fish & Richardson P.C.

(57) ABSTRACT

Compositions comprising hydrogenated and dehydrogenated graphite comprising a plurality of flakes. At least one flake in ten has a size in excess of ten square micrometers. For example, the flakes can have an average thickness of 10 atomic layers or less.

9 Claims, 7 Drawing Sheets

(51) Int. Cl.
*B82Y 30/00* (2011.01)
*B82Y 40/00* (2011.01)
*H01M 4/587* (2010.01)
*H01M 4/62* (2006.01)

(52) U.S. Cl.
CPC ........ *Y10S 977/734* (2013.01); *Y10S 977/842* (2013.01)

(56) References Cited

U.S. PATENT DOCUMENTS

| | | |
|---|---|---|
| 2006/0180477 A1 | 8/2006 | Avdeev et al. |
| 2009/0155561 A1 | 6/2009 | Choi et al. |
| 2015/0021196 A1 | 1/2015 | Zahmu et al. |
| 2015/0027900 A1 | 1/2015 | Dryfe et al. |

FOREIGN PATENT DOCUMENTS

| | | |
|---|---|---|
| RU | 2352029 | 4/2009 |
| RU | 2625910 | 7/2017 |
| WO | WO 2012120264 | 9/2012 |
| WO | WO 2015019093 | 2/2015 |
| WO | WO 2015131933 | 9/2015 |

OTHER PUBLICATIONS

Cancado et al., "Quantifying defects in graphene via Raman spectroscopy at different excitation energies," Nano Lett, 2011, 11: 3190-3196.

Eigler et al., "Wet chemical synthesis of graphene," Adv. Mater, 2013, 25: 3583-3587.

Elias et al., "Control of graphene's properties by reversible hydrogenation: evidence for graphene," Science, 2009, 323: 610-613.

Ferrari et al., "Raman Spectrum of Graphene and Graphene Layers," Phys. Rev. Lett, 2006, 97: 187401.

Ghosh et al., "Dimensional crossover of thermal transport in few-layer graphene," Nat. Mater, 2010, 9: 555-558.

Hao et al., "The role of surface oxygen in the growth of large single-crystal graphene on copper," Science, 2013, 342: 720-723.

Hernandez et al., "High-yield production of graphene by liquid-phase exfoliation of graphite," Nature Nanotechnology, Sep. 2008, 3: 563-568.

Hummers, Jr. and Offeman, "Preparation of Graphitic Oxide," J. Am. Chem. Soc, Mar. 1958, 80: 1339-1339.

International Search Report and Written Opinion in International Application No. PCT/EP2016/073451, dated Nov. 16, 2016, 14 pages.

Khan et al., "Size selection of dispersed, exfoliated graphene flakes by controlled Centrifugation," Carbon, 2012, 50(2): 470-475.

Kumar et al., "Ultrahigh electrically and thermally conductive self-aligned graphene/ polymer composites using large-area reduced graphene oxides," Carbon, 2016, 101: 120-128.

Lee et al., "Wafer-scale growth of single-crystal monolayer graphene on reusable hydrogen-terminated germanium," Science, 2014, 344: 286-289.

Paton et al., "Scalable production of large quantities of defect-free few-layer graphene by shear exfoliation in liquids," Nature Materials, Jun. 2014, 13: 624-630.

Pimenta et al., "Studying disorder in graphite-based systems by Raman spectroscopy," Phys. Chem. Chem. Phys, 2007, 9: 1276-1290.

Pollard and Roy, Graphene characterisation and standardisation via Raman spectroscopy, Spectrosc. Eur, 2015, 27: 9-12.

Schafer et al., "On the way to graphane-pronounced fluorescence of polyhydrogenated graphene," Angew. Chem. Int. Ed, 2013, 52: 754-757.

Wang et al., "Direct Growth of Graphene Film on Germanium Substrate," Scientific Reports, 2013, 3: 2465.

Wang et al., "High-yield synthesis of few-layer graphene flakes through electrochemical expansion of graphite in propylene carbonate electrolyte," J. Am. Chem. Soc, 2011, 133: 8888-8891.

Yang et al., "Birch reduction of graphite. Edge and interior functionalization by hydrogen," J. Am. Chem. Soc, Nov. 2012, 134: 18689-18694.

Zhao et al., "Electrochemical generation of hydrogenated graphene flakes," Carbon, Nov. 2014, 83: 128-135.

International Preliminary Report on Patentability in International Application No. PCT;EP2016/073451, dated Aug. 23, 2018, 9 pages.

CN Office Action in Chinese Application No. 201680081657.2, dated Sep. 4, 2019, 15 pages (With English Machine Translation).

Abdelkader et al., "Continuous Electrochemical Exfoliation of Micrometer-Sized Graphene Using Synergistic Ion Intercalations and Organic Solvents," ACS Pub., 2014, 6:1632-9.

Achee et al., "High-yield scalable graphene nanosheet production from compressed graphite using electrochemical exfoliation," Scientific Rep., Sep. 2018, 8:14525.

Roscher et al., "Abstract for High-yield electrochemical exfoliation of graphene using high potentials," Poster presented at Graphene Conference, Dresden Germany, Jun. 26-29, 2018.

Roscher et al., "High voltage electrochemical exfoliation of graphite for high-yield graphene production," RSC Adv., 2019, 9:29305-11.

Roscher et al., "High-yield electrochemical exfoliation of graphene using high potentials," Poster presented at Graphene Conference, Dresden Germany, Jun. 26-29, 2018,.

Wang et al.. "Preparation of Graphene Sheets by Electrochemical Exfoliation of Graphite in Confined Space and Their Application in Transparent Conductive Films," ACS Pub., 2017, 9:3445666.

RU Office Action and Search Report in Russian Application No. 2018131253, dated Dec. 9, 2019, 17 pages (with English Translation).

FIG. 2c  FIG. 2d

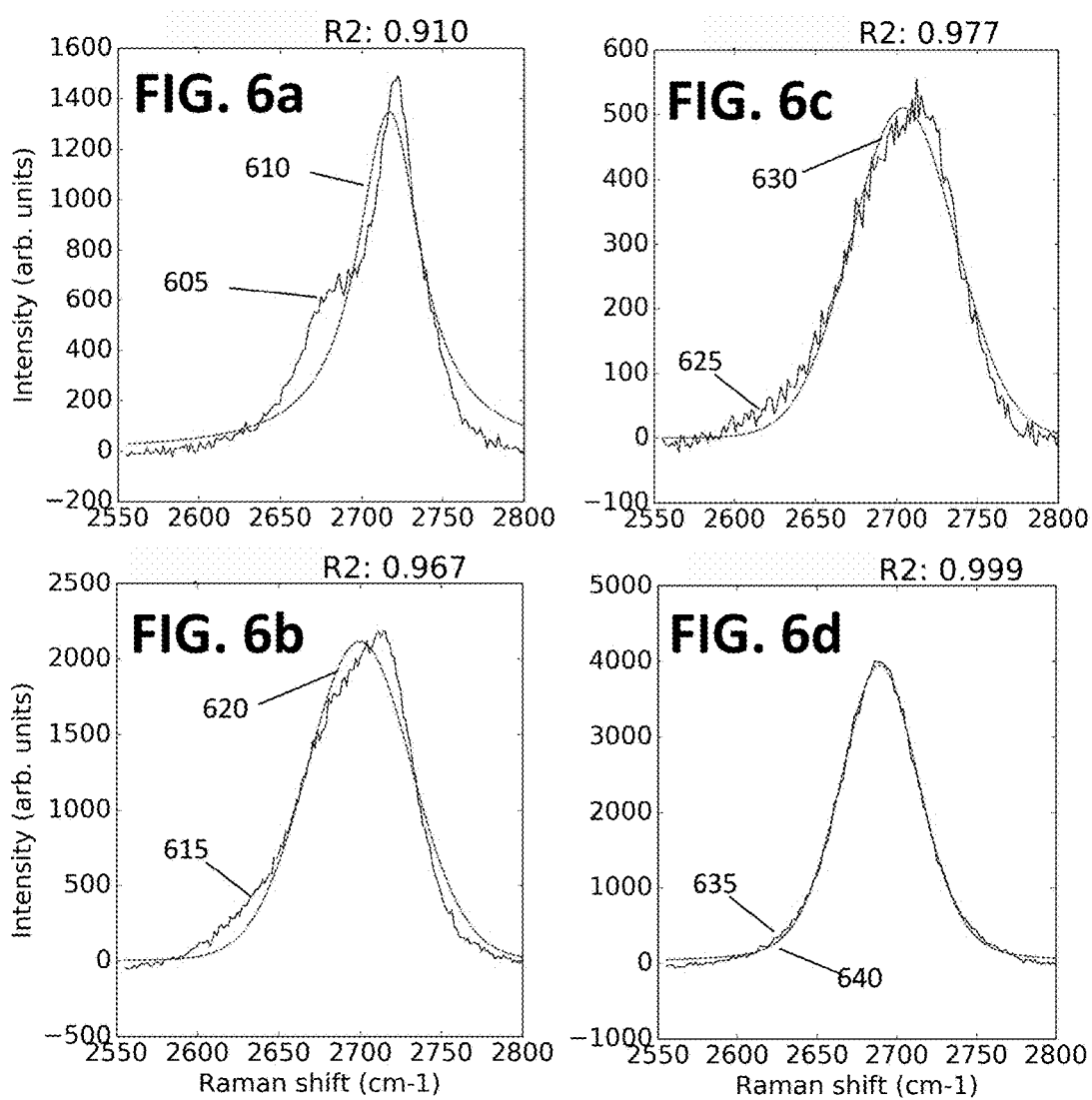

GRAPHENE AND THE PRODUCTION OF GRAPHENE

PRIORITY

This application is a Continuation under 35 U.S.C. § 111(a) of International Application No. PCT/EP2016/073451, filed Sep. 30, 2016, which claims the priority of German Patent Application No. 102016202202.4, filed Feb. 12, 2016 in the German Patent and Trademark Office. The entire contents of both applications are incorporated herein by reference.

BACKGROUND

This disclosure relates to graphene and the production of graphene, including an apparatus and a method for expansion of graphite to graphene.

Idealized graphene is a one-atom-thick layer of graphite that is infinitely large and impurity free. In the real world, graphene is of finite size and includes impurities. Notwithstanding these imperfections, the physical properties of real-world graphene are dominated by sp2-hybridized carbon atoms that are surrounded by three other carbon atoms disposed in a plane at angles of 120° from one another, thereby approximating an infinite sheet of pure carbon. As a result of this structure, graphene has a number of very unusual physical properties, including very high elastic modulus-to-weight ratios, high thermal and electrical conductivity, and a large and nonlinear diamagnetism. Because of these unusual physical properties, graphene can be used in a variety of different applications, including conductive inks that can be used to prepare conductive coatings, printed electronics, or conductive contacts for solar cells, capacitors, batteries, and the like.

Although idealized graphene includes only a single layer of carbon atoms, graphene structures that include multiple carbon layers (e.g., up to 10 layers, or up to 6 layers) can provide comparable physical properties and can be used effectively in many of these same applications. For the sake of convenience, both single atomic layer graphene and such multi-layered structures with comparable physical properties are referred to as "graphene" herein.

There are a variety of different types of graphene and other carbonaceous flake materials. Basic characteristics of some of these materials are now described.

Chemical Vapor Deposition: Chemical vapor deposition (CVD) can be used to produce graphene monolayers that have large flake sizes and low defect densities. In some cases, CVD yields graphene with multiple layers. In some cases, CVD can yield graphene that has macroscopic flake sizes (e.g., approaching 1 cm in length).

Examples of the use of CVD to produce graphene can be found in *Science* 342: 6159, p. 720-723 (2013), *Science* 344: 6181, p. 286-289 (2014), and *Scientific Reports* 3, Art. No.: 2465 (2013). According to the abstract of this last example, "[c]hemical vapor deposition of graphene on transition metals has been considered as a major step towards commercial realization of graphene. However, fabrication based on transition metals involves an inevitable transfer step which can be as complicated as the deposition of graphene itself."

Natural graphite: Graphite occurs in nature and can be found in crystalline flake-like form that includes several tens to thousands of layers. The layers are typically in an ordered sequence, namely, the so-called "AB stacking," where half of the atoms of each layer lie precisely above or below the center of a six-atom ring in the immediately adjacent layers. Because graphite flakes are so "thick," they display physical properties that differ from those of graphene and many of these physical properties are relevant to different applications. For example, graphite flakes are very weak in shear (i.e., the layers can be separated mechanically) and have highly anisotropic electronic, acoustic, and thermal properties. Due to the electronic interaction between neighboring layers, the electrical and thermal conductivity of graphite is lower than the electrical and thermal conductivity of graphene. The specific surface area is also much lower, as would be expected from a material with a less planar geometry. Further, in typical flake thicknesses, graphite is not transparent to electromagnetic radiation at a variety of different wavelengths. In some cases, graphite flakes can have macroscopic flake sizes (e.g., 1 cm in length).

An example of a characterization of graphite-based systems by Raman spectroscopy can be found in *Phys. Chem. Chem. Phys.* 9, p. 1276-1290 (2007).

Graphene Oxide: Chemical or electrochemical oxidation of graphite to graphite oxide followed by exfoliation can be used to produce graphene oxide flakes. One of the more common approaches was first described by Hummers et al. in 1958 and is commonly referred to as "Hummer's method." *J. Am. Chem. Soc.* 80 (6) p. 1339-1339 (1958). In some cases, the graphene oxide can subsequently be partially reduced to remove some of the oxygen.

However, oxidative etching of graphite not only separates graphene layers from each other, but also attacks the hexagonal graphene lattice. In general, the resulting graphene oxide is defect-rich and, as a result, displays reduced electrical- and thermal-conductivity, as well as a reduced elastic modulus. In addition, the in-plane etching of graphene flakes typically leads to relatively smaller lateral dimensions, with flake sizes being below few micrometers. In some cases, the average size of graphene oxide flakes in a polydisperse sample can be increased using physical methods such as, e.g., centrifugation.

Examples of methods for producing and/or handling graphene oxide can be found in *Carbon* 50(2) p. 470-475 (2012) and *Carbon* 101 p. 120-128 (2016).

Liquid phase exfoliation: Flakes of carbonaceous material can be exfoliated from graphite in a suitable chemical environment (e.g., in an organic solvent or in a mixture of water and surfactant). The exfoliation is generally driven by mechanical force provided by, e.g., ultrasound or a blender. Examples of methods for liquid phase exfoliation can be found in *Nature Materials* 13 p. 624-630 (2014) and *Nature Nanotechnology* 3, p. 563 -568 (2008).

Although the researchers who work with liquid phase exfoliation techniques often refer to the exfoliated carbonaceous flakes as "graphene," the thickness of the vast majority of flakes produced by such exfoliation techniques often appears to be in excess of 10 layers. This can be confirmed using, e.g., Raman spectroscopc techniques. For example, in Phys. Rev. Lett. 2006, 97, 187401, an asymmetric shape of the Raman band around 2700 reciprocal centimeters indicates that these flakes are thicker than 10 layers. Indeed, the predominant thickness of such flakes often appears to be in excess of 100 layers, which can be confirmed by x-ray diffraction, scanning probe microscopy or scanning electron microscopy. As a result of this large thickness, the material properties often do not correspond to the properties expected from graphene. At 10 layers, properties like thermal conductivity approach the values of bulk graphite with AB stacking, as described in Nat. Mater. 2010, 9, 555-558.

Properties like the specific surface area also scale with the inverse of the flake thickness.

Exfoliation of expanded graphite: Graphite can be expanded using thermal techniques such as, e.g., microwave irradiation. Flakes of carbonaceous material can be exfoliated from the expanded graphite in a suitable chemical environment (e.g., in an organic solvent or in a mixture of water and surfactant). The exfoliation is generally driven by mechanical force such as, e.g., ultrasound or a shear force from a blender. Examples of methods for liquid phase exfoliation of expanded graphite can be found in *J. Mater. Chem.* 22 p. 4806-4810 (2012) and WO 2015131933 A1.

Although the researchers who work with exfoliation of expanded graphite often refer to the exfoliated carbonaceous flakes as "graphene," the thickness of most of these flakes also appears to be in excess of 10 layers and even in excess of 100 layers. Analytical techniques for determining the thickness of flakes exfoliated from expanded graphite—and the consequences of this thickness—are similar to those described above with respect to liquid phase exfoliation.

Reduction of graphite: Graphite can be reduced and graphene exfoliated in strongly reductive environments via, e.g., Birch reduction in lithium. As graphene is increasingly reduced, more and more carbon atoms become hydrogenated and sp3-hybridized. In theory, the atomic C/H ratio can approach one, i.e., the resulting material becomes graphane rather than graphene. Examples of methods for the reduction of graphite can be found in *J. Am. Chem. Soc.* 134, p. 18689-18694 (2012) and *Angew. Chem. Int. Ed.* 52, p. 754-757 (2013).

Lithium and other reductants that can be used to reduce graphite are very strong, difficult to handle, and difficult to dispose.

Electrochemical expansion: Graphene can also be produced by electrochemical cathodic treatment. Examples of methods for electrochemical expansion can be found in WO2012120264 A1 and *J. Am. Chem. Soc.* 133, p. 8888-8891 (2011). The reductive environment can also induce hydrogenation of the resulting flakes, as described in *Carbon* 83, p. 128-135 (2015) and WO2015019093 A1. In general, electrochemical expansion at conventional conditions often cannot produce a significant amount of graphene flakes with a thickness below 10 layers, which can be confirmed using Raman spectroscopy.

For the sake of validating the various analytical techniques described herein, various materials have been used as references.

A first such reference material is reduced graphene oxide obtained from Graphenea S. A. (Avenida Tolosa 76,20018—San Sebastián SPAIN.) According to Graphenea S. A.'s product datasheet (available at https://cdn.shopify.com/s/files/1/0191/2296/files/Graphenea_rGO_Datasheet_2014-03-25.pdf?2923), this sample is 77-87 atomic % carbon, 0-1 atomic % hydrogen, 0-1 atomic % nitrogen, 0 atomic % sulfur, and 13-22 atomic % oxygen. It is believed that the reduced graphene oxide in this sample was produced by a modified Hummer's and subsequent chemical reduction. For the sake of convenience, this material is referred to as "GRAPHENEA RGO" herein.

A second such reference material was obtained from Thomas Swan & Co. Ltd. (Rotary Way, Consett, County Durham, DH8 7ND, United Kingdom) under the trademark "ELICARB GRAPHENE." The datasheet for this material is available at http://www.thomas-swan.co.uk/advanced-materials/elicarb%C2%AE-graphene-products/elicarb%C2%AE-graphene. According to this datasheet, the graphene in this sample was produced by solvent exfoliation and particle size is in the 0.5 to 2.0 micrometer range. For the sake of convenience, this material is referred to as "ELICARB GRAPHENE" herein.

A third such reference material is expanded graphite (EG), produced by thermal expansion of conventional graphite intercalation compounds that are typically produced by chemical oxidation. One example expanded graphite is "L2136," a non-commercial material made available by Schunk Hoffmann Carbon Technologies AG (Au 62, 4823 Bad Goisern am Hallstättersee, Austria). The company does not disclose details about the manufacturing at the present time. For the sake of convenience, this material is referred to as "L2136" herein.

SUMMARY

Graphene and the production of graphene, including an apparatus and a method for expansion of graphite to graphene, are described herein.

In a first aspect, a composition includes dehydrogenated graphite comprising a plurality of flakes. The flakes have at least one flake in 10 having a size in excess of 10 square micrometers, an average thickness of 10 atomic layers or less, and a defect density characteristic of at least 50% of µ-Raman spectra of the de-hydrogenated graphite collected at 532 nm excitation with a resolution better than 1.8 reciprocal centimeters having a D/G area ratio below 0.5.

In a second aspect, a composition includes dehydrogenated graphite comprising a plurality of flakes having at least one flake in 10 having a size in excess of 10 square micrometers, a coefficient of determination value of 2D single peak fitting of µ-Raman spectra of the de-hydrogenated graphite collected at 532 nm excitation with a resolution better than 1.8 reciprocal centimeters larger than 0.99 for more than 50% of the spectra, and a defect density characteristic of at least 50% of µ-Raman spectra of the de-hydrogenated graphite collected at 532 nm excitation with a resolution better than 1.8 reciprocal centimeters having a D/G area ratio below 0.5.

The first or second aspect can include one or more of the following features. More than 60%, for example, more than 80%, or more than 85% of µ-Raman spectra of the de-hydrogenated graphite can have the coefficient of determination value larger than 0.99. More than 40%, for example, more than 50% or more than 65% of the µ-Raman spectra of the de-hydrogenated graphite can have the coefficient of determination value larger than 0.995. At least one flake in six can have a size in excess of 10 square micrometers, for example, at least one flake in four. At least one flake in ten can have a size in excess of 25 square micrometers, for example, at least two flakes in ten. The average thickness can be seven atomic layers or less, for example, five atomic layers or less. The defect density can be characteristic of at least 80% of the collected spectra having a D/G area ratio below 0.5, for example, at least 95% of the collected spectra having a D/G area ratio below 0.5. The defect density can be characteristic of at least 80% of the collected spectra having a D/G area ratio below 0.5, for example, at least 95% of the collected spectra having a D/G area ratio below 0.5. The defect density can be characteristic of at least 50% of the collected spectra having a D/G area ratio below 0.2, for example, at least 70% of the collected spectra having a D/G area ratio below 0.2. The defect density can be characteristic of at the average D/G area ratio being below 0.8, for example, below 0.5 or below 0.2. The composition can be a particulate powder of dehydrogenated graphite flakes, for example, a black particulate powder of dehydrogenated graphite flakes. The plurality of the flakes of the dehydrogenated graphite can be wrinkled, crumpled, or folded, for example, wherein the plurality of the flakes are assembled into a 3-dimensional structure. The full width half maximum of the G peak in μ-Raman spectra of the de-hydrogenated graphite collected at 532 nm excitation with a resolution better than 1.8 reciprocal centimeters can be larger than 20 reciprocal centimeters, for example, larger than 25 reciprocal centimeters or larger than 30 reciprocal centimeters. The μ-Raman spectra of the de-hydrogenated graphite collected at 532 nm excitation with a resolution better than 1.8 reciprocal centimeters can show a broad peak in the range between 1000 and 1800 reciprocal centimeters with a full width half maximum of more than 200 reciprocal centimeters, for example more than 400 reciprocal centimeters. More than 1%, for example, more than 5% or more than 10% of the flakes can be of a thickness of more than 10 atomic layers. The composition can be a composite, for example, wherein the composite further includes activated carbon or wherein the composite further includes a polymer. The composition can be a composite and at least 30%, for example, at least 50% or at least 70% % of sp3 hybridized carbon sites of the composition are one or more of functionalized with a non-hydrogen chemical group, cross-linked with sp3 hybridized carbon sites of another flakes, or otherwise chemically modified.

An electrode can include the composite of the first or the second aspect. The electrode can be part of a battery or an electrochemical capacitor, for example, a lithium battery, a lithium-ion battery, a silicon anode battery, or a lithium sulfur battery.

In a third aspect, a composition can include hydrogenated graphite comprising a plurality of flakes. The flakes can have at least one flake in 10 having a size in excess of 10 square micrometers, an average thickness of 10 atomic layers or less, and a defect density characteristic of μ-Raman spectra of the hydrogenated graphite collected at 532 nm excitation with a resolution better than 1.8 reciprocal centimeters and an excitation power below 2 mW at the focus of an 100× objective having an average D/G area ratio being between 0.2 and 4, wherein the majority of the defects are reversible hydrogenation of sp3-hybridized carbon sites away from the edges of the flakes.

In a third aspect, a composition can include a reversibly hydrogenated graphite comprising a plurality of flakes having at least one flake in 10 having a size in excess of 10 square micrometers, a coefficient of determination value of 2D single peak fitting of μ-Raman spectra of the graphite after thermal treatment in inert atmosphere at 2 mbar and 800° C., collected at 532 nm excitation with a resolution better than 1.8 reciprocal centimeters, of larger than 0.99 for more than 50% of the spectra, and a defect density characteristic of μ-Raman spectra of the hydrogenated graphite collected at 532 nm excitation with a resolution better than 1.8 reciprocal centimeters and an excitation power below 2 mW at the focus of an 100× objective having an average D/G area ratio being between 0.2 and 4. The majority of the defects are reversible hydrogenation of sp3-hybridized carbon sites away from the edges of the flakes.

The third aspect and the fourth aspect can include one or more of the following features. More than 60%, for example, more than 80%, or more than 85% of μ-Raman spectra of the graphite can have the coefficient of determination value larger than 0.99. More than 40%, for example, more than 50% or more than 65% of the μ-Raman spectra of the graphite can have the coefficient of determination value larger than 0.995. At least one flake in six can have a size in excess of 10 square micrometers, for example, at least one flake in four. At least one flake in ten can have a size in excess of 25 square micrometers, for example, at least two flakes in ten. The average thickness can be seven atomic layers or less, for example, five atomic layers or less. The defect density can be characteristic of at least 50% of the μ-Raman spectra collected at 532 nm excitation with a resolution better than 1.8 reciprocal centimeters and an excitation power below 2 mW at the focus of an 100× objective having a D/G area ratio above 0.5, for example, at least 80% or at least 95% of the collected spectra having a D/G area ratio above 0.5. The defect density can be characteristic of at least 50% of the collected spectra having a D/G area ratio above 0.8, for example, at least 60% or at least 90% of the collected spectra having a D/G area ratio above 0.8. The defect density can be characteristic of the average D/G area ratio being between 0.4 and 2, for example, between being 0.8 and 1.5. At least 60%, for example, at least 75% of the defects can be reversible hydrogenation of sp3-hybridized carbon sites away from the edges of the flakes. The composition can be a composite and at least 5%, for example, at least 10%, of sp3 hybridized carbon sites of the composition can be one or more of a) functionalized with a chemical group, b) cross-linked with sp3 hybridized carbon sites of another flakes, or c) otherwise chemically modified.

In a fifth aspect, an apparatus for the expansion of the graphite to graphene includes at least one container provided for receiving an electrolyte, at least one anode and at least one cathode, wherein the cathode contains diamond or consists thereof.

The fifth aspect can include one or more of the following features. The apparatus can include a separator which separates the anode from the cathode. The separator can be in contact with the surface of the anode or the separator can be diamond and/or polytetrafluoroethylene and/or Al2O3 and/or ceramic and/or quartz and/or glass contains or consists thereof. The can include a drive means with which the separator, and optionally the anode, are rotatable. The apparatus can include a separator, and optionally an anode, that are displaceably mounted so that the distance between the cathode and the separator is changeable in operation of the apparatus. The apparatus can include an electric voltage supply set up to apply a DC voltage of from about 5 V to about 60 V between the anode and cathode, or from about 15 V to about 30 V, wherein the voltage is optionally pulsed. The apparatus can include a feed apparatus by which electrolyte and graphite particles can be fed as a dispersion into the at least one container and/or a discharge apparatus by which electrolyte and graphene flakes are dischargable from the at least one container as a dispersion.

In a sixth aspect, a method for the expansion of the graphite to graphene includes introducing graphite particles and at least one electrolyte into at least one container, applying an electrical voltage to at least one anode and at least one cathode so that the graphite is expanded, wherein the cathode contains or consists of diamond and hydrogen is produced at the cathode.

The sixth aspect can include one or more of the following features. Hydrogen can be intercalated in the graphite particles and/or chemisorbed on the graphite particles, so that graphene flakes are exfoliated from the graphite particles. The anode can be separated from the cathode by a separator. The separator can contain or consist of diamond and/or polytetrafluoroethylene and/or Al2O3 and/or ceramic and/or quartz and/or glass. The separator, and optionally the anode, can be set into rotation and/or in that the separator, and optionally the anode are shifted so that the distance between the cathode and the separator changes during operation of the apparatus. An electrical voltage from about 5 V to about 60 V, or an electrical voltage from about 10 V to about 50 V, or an electrical voltage from about 12 V to about 45 V, or an electric voltage from about 15 V to about 30 V can be applied between the anode and cathode. Graphite particles can be supplied continuously to the container and/or that graphene flakes are removed continuously from the container. The graphene flakes can be photo-treated for dehydrogenation, for example, wherein the photo-treating can include illuminating the graphene flakes with visible light, UV, or microwaves, wherein more that 50% of hydrogenated sp3 hybridized carbon sites are de-hydrogenated. The method can include a subsequent thermal treatment of the graphene flakes at a temperature from about 100° C. to about 800° C., or from about 300° C. to about 650° C., and for a period of from about 1 min to about 60 min, or from about 15 min to about 40 min. The graphene flakes can have an average surface area of more than 10 um2 or more than 50 um2 or of more than 100 um2.

The details of one or more implementations are set forth in the accompanying drawings and the description below. Other features, objects, and advantages will be apparent from the description and drawings, and from the claims.

DESCRIPTION OF DRAWINGS

FIG. 2c are scanning electron micrographs of ELICARB GRAPHENE.

FIG. 2d are scanning electron micrographs of GRAPHENEA RGO.

FIG. 6a shows 2D peak spectroscopic data and a least-square error fitted peak for graphite suitable for use as a starting material in the apparatus of FIG. 1.

FIG. 6b shows 2D peak spectroscopic data and a least-square error fitted peak for ELICARB GRAPHENE.

FIG. 6c shows 2D peak spectroscopic data and a least-square error fitted peak for a first sample of separated and dehydrogenated graphite layers.

FIG. 6d shows 2D peak spectroscopic data and a least-square error fitted peak for a second sample of separated and dehydrogenated graphite layers.

Like reference symbols in the various drawings indicate like elements.

DETAILED DESCRIPTION

Figure 1:
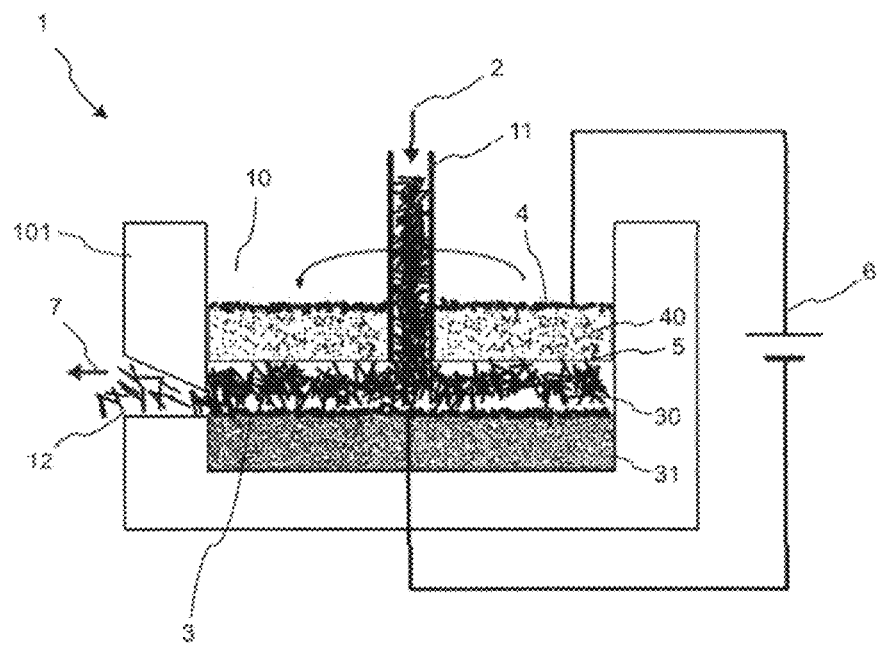
FIG. 1 is a schematic representation of an apparatus for the expansion of graphite.

FIG. 1 shows an apparatus 1 that can be used to produce graphene using the methods described herein. Apparatus 1 basically includes a container 10 that is bounded by a container wall 101. Container 10 can have a round base and a generally cylindrical shape.

In the illustrated embodiment, a cathode 3 is disposed in container 10 and either forms the bottom surface or substantially fills the entire bottom surface of container 10. Cathode 3 includes a base body 31 that contains, for example, a metal, an alloy, or porous silicon. A diamond layer is deposited on the base body 31 and may be produced, e.g., by chemical vapor deposition. The diamond layer of the cathode 3 may have a thickness of about 0.5 um to about 20 to um or from about 2 to about 5 um. The diamond layer of the cathode 3 may optionally be doped using an n- or p-type dopant to reduce the electric resistance of the cathode. In some implementations, boron may be used as a dopant.

An anode 4 is also disposed in container 10. The anode has a shape and size that substantially occupies the entire base of the container 10. In this manner, a largely homogeneous electrical field is generated in container 10 and a large percentage of the container volume can be utilized in the production of the graphene.

In some implementations, anode 4 can include or be formed of a metal or an alloy. In some implementations, anode 4 may also include or be formed of diamond. The diamond may be mounted on a base body, as described with regard to the cathode, or implemented as free-standing diamond layer.

An optional separator 5 is also disposed in container 10. Separator 5 may include or be formed of, for example, polytetrafluoroethylene (PTFE), diamond, Al2O3 or other material. Separator 5 may include or be formed of a dielectric. Separator 5 can be provided with holes or with pores that, for example, have a diameter of less than 10 um, less than 5 um, less than 1 micrometer, or less than 0.5 um. This allows the passage of electrolyte (for example, liquid water) and ions through separator 5 while preventing particles of graphite or graphene that are found within container 10 from coming into contact with anode 4.

In the illustrated implementation, separator 5 separates a cathode chamber 30 from an anode chamber 40. In other implementations, the separator 5 can be deposited directly on the anode 4 or fixed to the anode 4, for example, by adhesive bonding. Accordingly, anode chamber 40 can be omitted in some implementations.

In operation, at least one electrolyte is disposed in the container 10 between anode 4 and cathode 3. In some implementations, the electrolyte may be an aqueous electrolyte, and may optionally contain substances for increasing the electrical conductivity such as, for example, dilute acids or salts. In other implementations, the electrolyte may include or be formed of at least one organic solvent. In still other implementations, the electrolyte can include propylene carbonate and/or dimethylformamide and/or organic salts, whose ions inhibit the formation of a stable crystal lattice through charge delocalization and steric effects so that they are liquid at temperatures below 100° C.

Further, graphite in the form of particles 2 is disposed in the cathode chamber 30 during operation of apparatus 1. The graphite particles 2 are dispersed in the electrolyte.

With this arrangement, an electrical voltage of between approximately 5 V and approximately 60 V, or between approximately 15 V and approximately 30 V is applied between cathode 3 and anode 4 by an electric voltage source 6. This generates an electric field in the electrolyte.

With such a high electric voltage present, the water and/or an organic solvent present in the electrolyte can be dissociated with high efficiency. This produces hydrogen at cathode 3 and oxygen at anode 4. The graphite disposed in the cathode chamber 30 takes up this hydrogen by intercalation of individual atoms or molecules between the lattice planes of the graphite lattice and/or chemisorption of individual atoms or molecules on the surface. In other words, the graphite becomes hydrogenated. Separator 5 thereby prevents graphite from coming into contact with anode 4, e.g., by penetrating into the anode chamber 40. Thus, the graphite disposed in container 10 is kept away from the resulting oxygen at anode 4 and oxygen does not intercalate in the graphite.

By rotation of separator 5 in container 10, a shear flow can be produced in the cathode chamber 30 which leads to mixing of the electrolyte and the dispersed graphite. This mixing can provide a uniform treatment of the graphite particles.

Furthermore, apparatus 1 may include an optional feed apparatus 11 through which electrolyte and graphite can be introduced as a dispersion into the cathode chamber 30. Moreover, apparatus 1 may include an optional discharge apparatus 12 through which hydrogenated graphite 7 can be discharged. Mass transport from a feed apparatus 11 that is generally concentric with the base of the container 10 to a discharge apparatus 12 that is arranged at a peripheral rim of container 10 may be encourages by the rotation of separator 5. In this way, apparatus 1 can be operated continuously by continuously feeding graphite particles 2 through feed apparatus 11 and discharging hydrogenated graphite 7 through discharge apparatus 12.

Figure 1A:
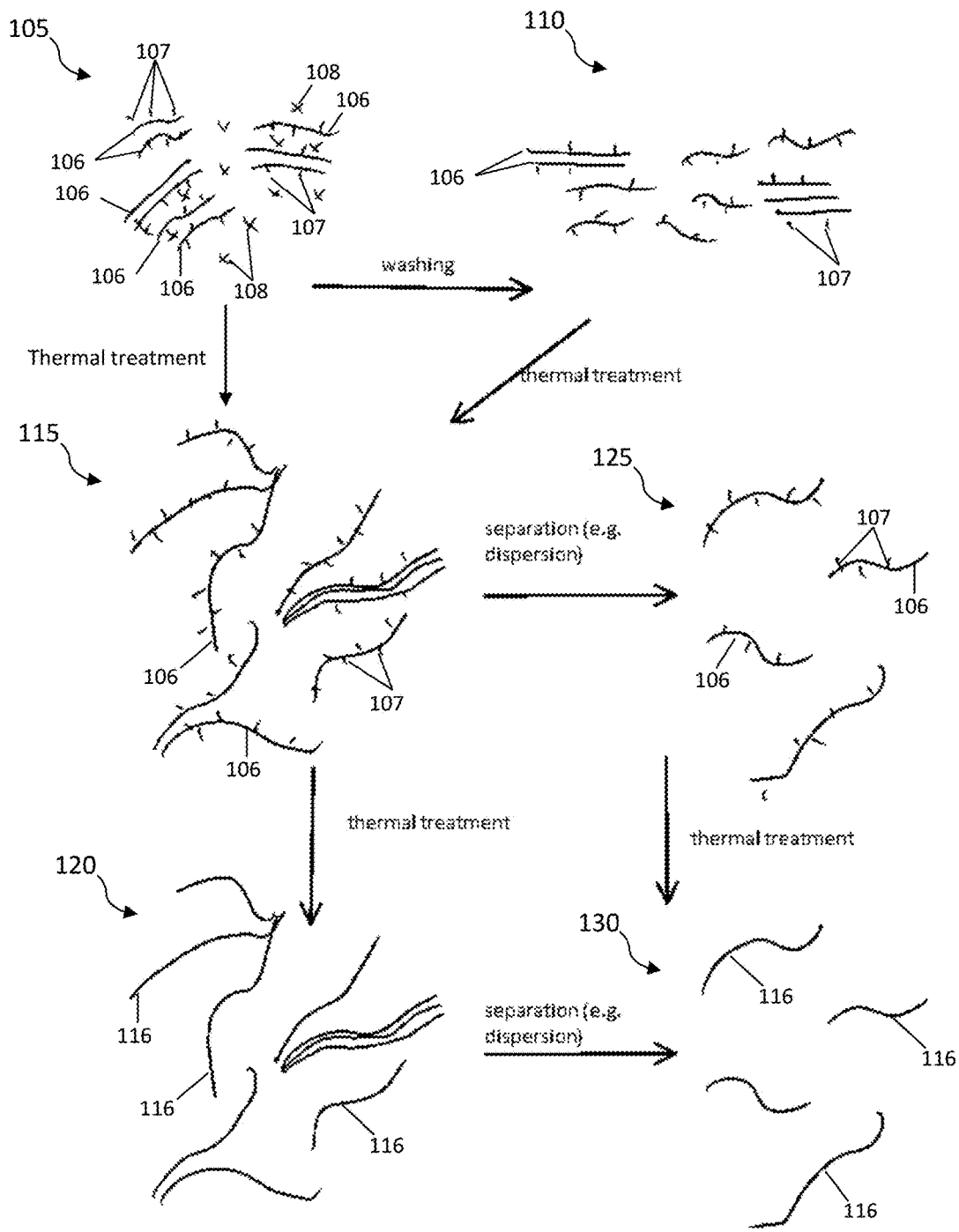
FIG. 1a is a schematic representation of the hydrogenated graphite and graphene produced by the apparatus of FIG. 1 and the impact of various subsequent processing steps on that material.

FIG. 1a is a schematic representation of the hydrogenated graphite produced by apparatus 1 and the impact of various subsequent processing steps on that material.

In particular, reference numeral 105 designates the hydrogenated graphite suspension discharged from apparatus 1. As discussed above, suspension 105 includes hydrogenated graphite layers 106 with intercalated and/or chemisorbed hydrogen. At least some of the chemisorbed hydrogen is bound to sp3-hybridized carbon sites 107 away from the edges of layers 106. In the schematic representation of FIG. 1a, hydrogenated graphite layers 106 are schematically illustrated as relatively longer curved or straight lines and the sp3-hybridized carbon sites 107 are schematically illustrated as short lines that branch off the longer lines representing layers 106.

The suspension 105 discharged from apparatus 1 also includes organic solvents or salts 108 from the electrolyte of the electrochemical cell. In the schematic representation of FIG. 1a, the organic solvents or salts 108 are schematically illustrated as small "x's."

Hydrogenated graphite layers 106 are electrochemically expanded relative to the graphite that was input into apparatus 1. In particular, the hydrogenation of the input graphite is sufficient to cause at least partial delamination of adjacent layers, leading to "electrochemical expansion" of the graphite without complete physical separation of all layers from one another. In the schematic representation of FIG. 1a, the electrochemical expansion is schematically illustrated by showing groups of layers 106 in physical proximity to one another. In some instances, nearest-neighbor layers 106 include interstitial hydrogenation at sites 107 and/or organic solvents or salts 108. In other instances, nearest-neighbor layers 106 do not include interstitial hydrogenation at sites 107 and/or organic solvents or salts 108.

Notwithstanding the non-idealities of the finite size of layers 106, the incomplete separation of layers 106, and the presence of impurities such as sp3-hybridized carbon sites 107, hydrogenated graphite layers 106 can display graphene-like properties. In particular, the specific surface area and the mechanical strength of hydrogenated graphite layers 106 can be very high. Signatures characteristic of AB-stacked layers in x-ray scattering or Raman scattering are strongly reduced or absent.

In some implementations, organic solvents or salts from the electrolyte can be removed from hydrogenated graphite layers 106 by washing or rinsing with suitable solvents, e.g., ethanol or acetone.

The hydrogenated graphite suspension after washing/rinsing is designated by reference numeral 110 in FIG. 1a. After washing/rinsing, the number of sp3-hybridized carbon sites 107 in hydrogenated graphite layers 106 will generally remain effectively unchanged. Thus, in the schematic representation, layers 106 continue to include hydrogenation sites 107 in suspension 110.

Further, although there may be some increased delamination of adjacent layers 106, e.g., due to shearing forces that arise during washing or rinsing, the primary effect of the washing or rinsing is to remove organic solvents or salts 108. Thus, in the schematic representation, at least some layers 106 are shown in close proximity to one another.

In some implementations, rather than removing organic solvents or salts 108 by washing/rinsing, organic solvents or salts 108 can be removed by selectively evaporating the organic solvents or salts 108 from suspension 105 in a distillation process. In some implementations, such a distillation process can be combined with a thermal treatment process that yields suspension 115, as described below.

In some implementations, both a washing/rinsing and a distillation process can be used to remove organic solvents or salts 108.

Regardless of how suspension 110 is arrived at, the hydrogenated graphite layers 106 continue to display graphene-like properties, including high specific surface area and mechanical strength and the absence of signatures of characteristic of AB-stacked layers.

Either suspension 105 or suspension 110 can be treated using a thermal treatment process to yield a dried hydrogenated graphite material 115. The thermal treatment process is generally conducted in air or inert atmosphere below 300° C. The thermal treatment process generally includes a rapid heating and drives the suspending liquid into the gas phase. Since some liquid may also be found between adjacent hydrogenated graphite layers 106, the evaporation of this liquid generally drives the adjacent hydrogenated graphite layers 106 apart and "expands" the graphite. Material 115 includes hydrogenated graphite layers 106 that include sp3-hybridized carbon sites 107. After thermal treatment, the number of sp3-hybridized carbon sites 107 in hydrogenated graphite layers 106 will generally remain effectively unchanged. Thus, in the schematic representation, layers 106 continue to include hydrogenation sites 107 in hydrogenated graphite material 115.

Further, although there may be some incidental increased delamination of adjacent layers 106, the primary effect of the thermal treatment is removal of surrounding organic electrolyte and expansion of the hydrogenated graphite layers 106. The macroscopic density of hydrogenated graphite layers 106 in material 115 is thus generally significantly lower than the macroscopic density of hydrogenated graphite layers 106 in either suspension 105 or suspension 110.

After thermal treatment, the hydrogenated graphite layers 106 in dried carbonaceous material 115 continue to display graphene-like properties, including high specific surface area and mechanical strength and the absence of signatures of characteristic of AB-stacked layers.

In some implementations, dried hydrogenated graphite material 115 is subject to a dehydrogenating thermal treatment that yields an unseparated dry dehydrogenated graphite material 120. The dehydrogenating thermal treatment generally occurs at temperatures in excess of 300° C. and strips hydrogen from hydrogenated graphite layers 106 to yield dehydrogenated graphite layers 116. Dehydrogenated graphite layers 116 are generally 1 to 10 atomic layers or lattice planes thick and have a low hydrogen content. In some implementations, dehydrogenation can occur at decreased oxygen partial pressure, for example in nitrogen or argon gas at 2-20 mbar.

In the schematic representation, dehydrogenated graphite layers 116 are not separated from one another and do not include any hydrogenation sites 107. However, in the real world, dehydrogenated graphite layers 116 will generally not be completely hydrogen free. Rather, dehydrogenated graphite layers 116 would typically include some quantity of residual hydrogenation sites 107 or other sp3 carbon moieties that are characteristic of the manufacturing process.

Nevertheless, after the dehydrogenating thermal treatment, de-hydrogenated graphite material 120 not only continues to display the graphene-like properties that were previously discussed (i.e., high specific surface area and mechanical strength and the absence of signatures of characteristic of AB-stacked layers), but also additional graphene-like properties characteristic of sp2-hybridization of nearly all the carbon in dehydrogenated graphite layers 116. For example, chemical defects visible by Raman scattering are strongly reduced. Further, optical transparency decreases. This decrease is associated with a decrease in the band gap. Also, the electron conductivity of dehydrogenated graphite layers 116 is higher than the electron conductivity of layers 106.

In some implementations, the unseparated dried hydrogenated graphite material 115 is subject to a separation treatment that yields a separated and hydrogenated graphite suspension 125. For example, in some implementations, dried hydrogenated graphite material 115 can be dispersed in suitable liquids, e.g., with the aid of ultrasound or sheer force, to fully separate the flakes from each other. In some implementations, water with various surfactants, mesitylene, dimethylsulfoxide, benzene or mixtures thereof can be used.

Hydrogenated graphite suspension 125 includes separated and hydrogenated graphite layers 106 that include sp3-hybridized carbon sites 107. After separation, the number of sp3-hybridized carbon sites 107 in hydrogenated graphite layers 106 will generally remain effectively unchanged. Thus, in the schematic representation, layers 106 continue to include hydrogenation sites 107 in hydrogenated graphite material 115.

In the schematic representation, every single layer 106 is separated from other layers 106. However, in the real world, at least some layers 106 will generally not be separated from every other layer 106. Nevertheless, after the separation treatment, the layers 106 in hydrogenated graphite suspension 125 display graphene-like properties, including high specific surface area and mechanical strength and the absence of signatures of characteristic of AB-stacked layers. Further, individual layers 106 can be microscopically identified. These layers 106 are often wrinkled and crumpled, which indicates that they are only few atomic layers thick.

Based on these properties, it is believed that hydrogenated graphite suspension 125 would be a useful addition to polymer and other composites. In particular, hydrogenated graphite suspension 125 provides thin, large flakes while retaining some sp3-hybridized carbon. Such sp3-hybridized carbon sites may be useful, e.g., as reaction sites for forming chemical bonds or other interactions with other constituents of the composite.

In some implementations, the separated and hydrogenated graphite layers 106 of hydrogenated graphite suspension 125 is subject to a de-hydrogenating thermal treatment that yields a separated and de-hydrogenated graphite sample 130. For example, the liquid in graphite suspension 125 can be evaporated (e.g., by drop-casting) to provide dry hydrogenated graphite layers 106. The dry hydrogenated graphite layers 106 can be subject to the dehydrogenating thermal treatment. As another example, graphite suspension 125 can be enclosed in a pressure-resistant chamber and the entire suspension 125 can be subject to the dehydrogenating thermal treatment. The separated and dehydrogenated graphite 116 in graphite sample 130 can thus either be dried or in liquid suspension.

The de-hydrogenating thermal treatment can include subjecting sample to temperatures in excess of 300° C. and low oxygen partial pressures, for example, in nitrogen or argon gas at 2-20 mbar.

In the schematic representation, separated and dehydrogenated graphite layers 116 of sample 130 do not include any hydrogenation sites 107. However, in the real world, separated and dehydrogenated graphite layers 116 will generally not be completely hydrogen free. Rather, dehydrogenated graphite layers 116 would typically include some quantity of residual hydrogenation sites 107 or other sp3 carbon moieties that are characteristic of the manufacturing process. Further, in the schematic representation, every single dehydrogenated graphite 116 of sample 130 is separated from other layers 116. However, in the real world, at least some dehydrogenated graphite layers 116 will generally not be separated from every other layer 116. For example, in some implementations, 1% or more of layers 116 may have a thickness of more than 10 atomic layers, for example, more than 5% or even more than 10% of the flakes may have a thickness of more than 10 atomic layers. As another example, in some implementations, 1% or more of layers 116 may have a thickness of more than 50 or even 100 atomic layers, for example, more than 5% or even more than 10% of the flakes may have a thickness of more than 50 or 100 atomic layers.

Nevertheless, the separated and dehydrogenated graphite layers 116 of sample 130 display graphene-like properties, including a high specific surface area, mechanical strength, and an absence of signatures of characteristic of AB-stacked layers, as well as graphene-like properties characteristic of sp2-hybridization of nearly all the carbon in dehydrogenated graphite layers 116. For example, chemical defects visible by Raman scattering are strongly reduced, optical transparency decreases, and the electron conductivity of graphite layers 116 is high. Moreover, individual dehydrogenated graphite layers 116 can be microscopically identified. These separated and dehydrogenated graphite layers 116 are often wrinkled and crumpled, which indicates that they are only few atomic layers thick.

As an end result, separated and dehydrogenated graphite layers 116 can be referred to as graphene in which many of the individual particles have a thickness of only 1 to 10 atomic layers and lateral dimensions that are inherited from the starting graphite material (often well in excess of 100 micrometers) are produced. In contrast with other techniques, the graphene includes a low number of layers (i.e., has a small thickness) and displays graphene-like properties rather than properties of bulk graphite. Indeed, the method is capable of producing relatively large graphene flakes with an average area of over 10 um$^2$, more than 50 um$^2$, or more than 100 um$^2$. This method and apparatus thus allow high quality graphene to be produced in large quantities. The average surface area can be determined by transmission electron microscopy or scanning electron microscopy of a sample with a plurality of graphene flakes, wherein the size of the individual graphene flakes is determined by image analysis and statistical analysis.

Further, a sample 130 of separated and dehydrogenated graphite layers 116 can display several characteristics that distinguish it from graphene and graphite material samples produced by other methods. For example, a sample 130 of separated and dehydrogenated graphite layers 116 can be produced to yield a particulate powder that is black in color and relatively easy to handle in a variety of different contexts. For example, the powder can be admixed in bulk into liquids—with or without dispersants—to form suspensions such as inks or polymer composites.

Further, as discussed above, graphite layers 116 of a sample 130 of separated and dehydrogenated graphite layers 116 that are supported by a surface can appear under scanning electron microscopy or other imaging modality with wrinkles that arise due to crumpling or folding of layers 116. Not only does such wrinkling bespeak the low number of layers and small thickness of layers 116, the wrinkling also indicates that the fabrication of 3-dimensional structures in which graphite layers 116 are not confined to a single plane may be possible.

FIGS. 2a, 2b, 2c, 2d are scanning electron micrographs of different samples at magnifications indicated by the respective scale bars.

Figure 2A:
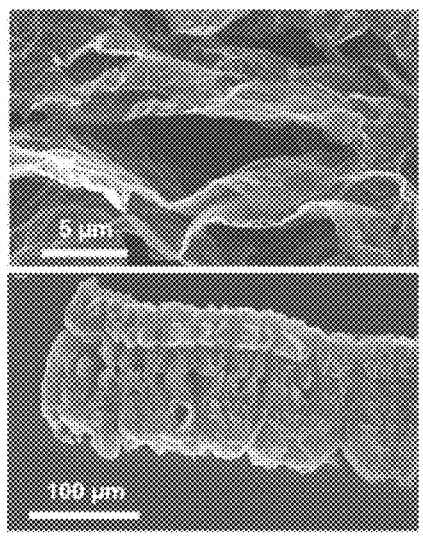
FIGS. 2a, 2b are scanning electron micrographs of graphite after the electrochemical expansion.

FIG. 2a are scanning electron micrographs of expanded and dehydrogenated graphite layers 116 after the electrochemical expansion using the method described above and after concurrent thermal expansion and de-hydrogenation by heating in argon atmosphere at 2 mbar and 770° C. An approximately vertical separation of the graphene into thin layers along the c-axis can be seen in the figure and there is no evidence of in-plane separation and fracturing of planes. It is thus believed that electrochemical and thermal expansion acts specifically to cause c-axis separation and the hexagonal crystalline structure and domain size from the source graphite is preserved in the product graphene flakes. These individual layers are similar to the lattice planes of graphite crystal, i.e., the lateral structure of the graphite that is used as the starting material remains.

Figure 2B:
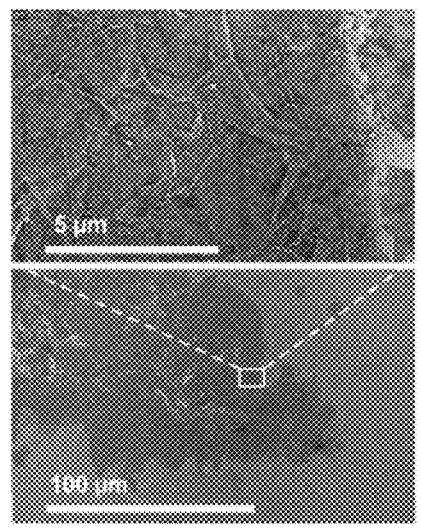

FIGS. 2b, 2c, 2d are scanning electron micrographs of samples that were dip-coated from dispersions onto polished, boron-doped conductive silicon <100> wafers. In particular, FIG. 2b shows graphene layers that were exfoliated from expanded graphite similar to that shown in FIG. 2a and dispersed in a solvent and then dip-coated onto the silicon substrate. The large lateral extent of graphene is clearly visible and, in this particular example, is more than 100 um.

In contrast, FIG. 2c shows graphene obtained from a commercial ELICARB GRAPHENE dispersion. As shown, the graphene displays an average size of about 1 um and no flakes with a diameter larger than 2 micrometers were observed.

FIG. 2d shows commercial GRAPHENEA RGO, dip-coated from a dispersion on a silicon substrate. As shown, individually-distinguishable flakes of the reduced graphene oxide display a diameter below 3 micrometers.

Figure 3:
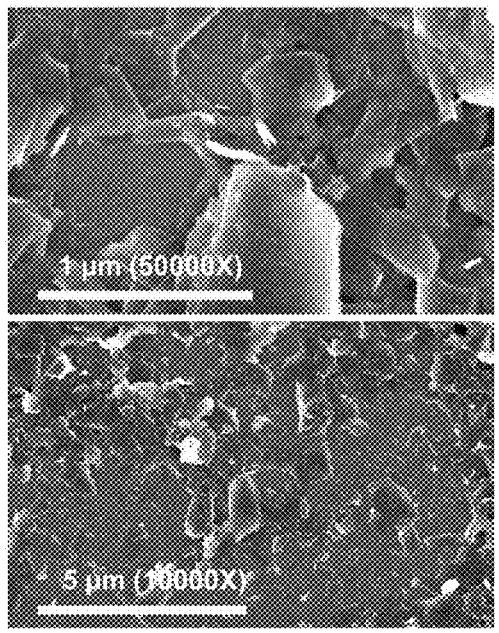
FIG. 3 is a Raman spectrum of graphite particles that had been expanded and thermally treated.
Figure 3:
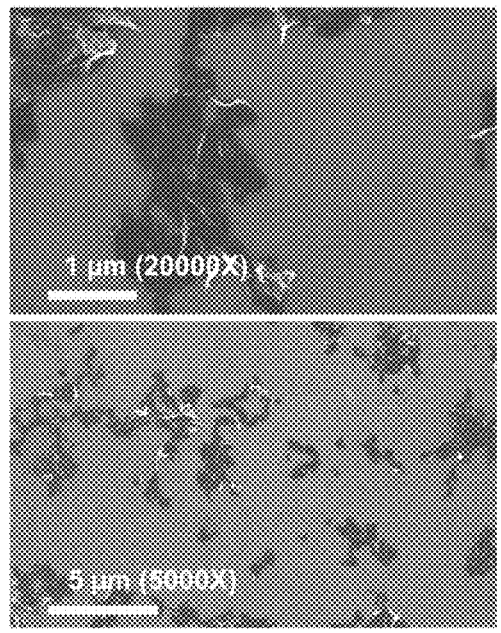
Figure 3:
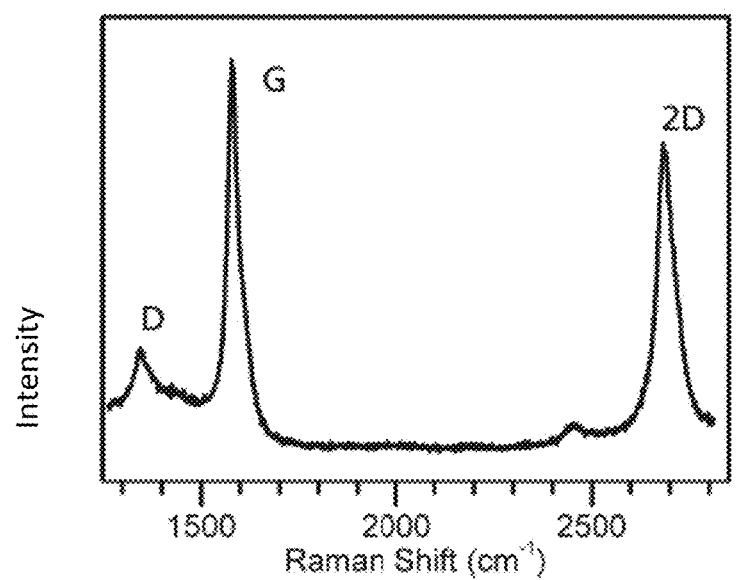

FIG. 3 is a Raman spectrum of graphite particles that had been expanded and thermally treated as described above with reference to FIG. 1 and illustrated in FIG. 1a. The symmetry and low full width half maximum of the 2D band indicates an expansion of the graphite to graphene flakes with a thickness of less than 10 atomic layers. The low relative intensity of the D band confirms desorption of hydrogen and a low number of structural defects in the graphene flake lattice.

Figure 4A:
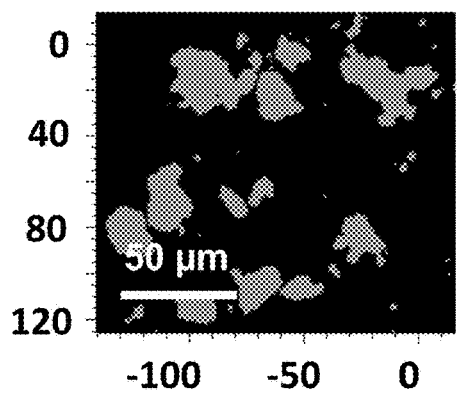
FIG. 4a is a spatially-resolved μ-Raman microscopy image of a graphene sample produced by the apparatus of FIG. 1.
Figure 4B:
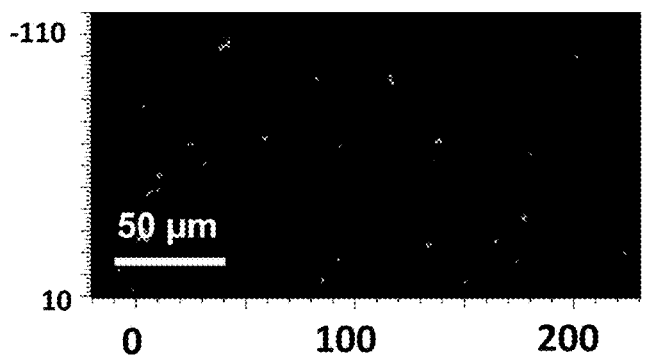
FIG. 4b is a spatially-resolved μ-Raman microscopy image of a sample of GRAPHENEA RGO.
Figure 4C:
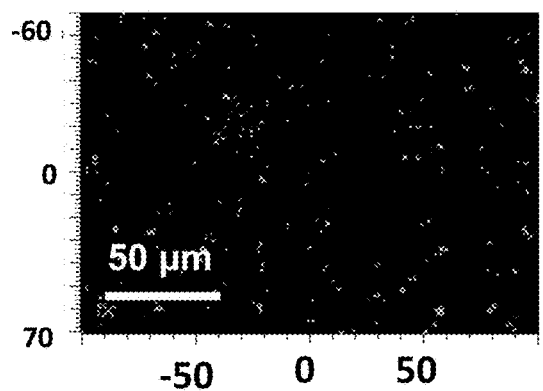
FIG. 4c is a spatially-resolved μ-Raman microscopy image of a sample of ELICARB GRAPHENE.
Figure 4D:
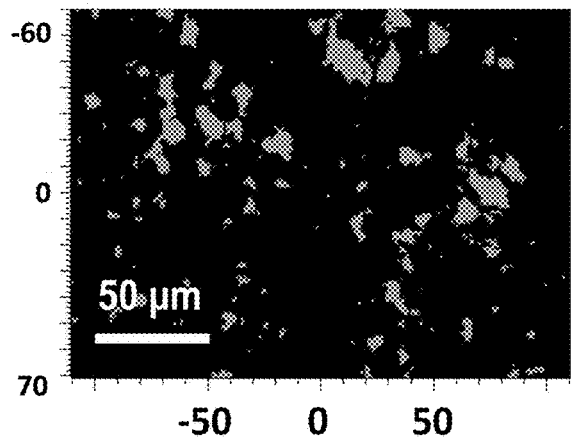
FIG. 4d is a spatially-resolved μ-Raman microscopy image of a sample of expanded graphite L2136.

FIGS. 4a, 4b, 4c, 4d are spatially-resolved μ-Raman microscopy images of different samples on a substrate. In particular, FIG. 4a is an image of a graphene sample produced by the electrochemical expansion of graphite to graphene using an approach consistent with the method described above. FIG. 4b is an image of a sample of GRAPHENEA RGO. FIG. 4c is an image of a sample of ELICARB GRAPHENE. FIG. 4d is an image of a sample of expanded graphite L2136.

The handling of the samples in FIGS. 4a, 4b, 4c, 4d prior to imaging was kept nearly identical as possible so that a direct comparison of the images could be meaningful. In particular, the four different samples were dispersed in mesitylene and then drop-cast on different locations on a single conductive, boron-doped, polished Si <100> wafer. Prior to drop-casting, the dispersions were placed in a soft ultrasound bath at ~40 W/l to improve homogeneity. Mesitylene was evaporated from the drop-castings at 300° C. on a hotplate. Since the boiling point of the mesitylene is approximately 165° C., this is believed to have effectively removed mesitylene from the samples. To distribute the flakes, deionized water was added on the hot wafer surface and a second wafer was placed on top until all water had evaporated. Excessive material was removed by soft ultrasound treatment in deionized water for 3 minutes at ~40 W/l. All images are taken from the respective locations on the single wafer.

To image the four different materials on the sample, a Renishaw InVia μ-Raman spectroscopy system was fitted with a 100× objective and set to an excitation wavelength of 532 nanometers. The Raman shift with a resolution of at least 1.8 reciprocal centimeters between 1265 and 2810 reciprocal centimeters was mapped with 1+/−0.1 micrometer spatial resolution over dimensions ranging between 20000 and 40000 square micrometers.

A baseline subtracted from the images was determined by fitting the spectra with a 6th order polynomial. Raman shifts between 1270 and 1720 reciprocal centimeters and between 2580 and 2790 reciprocal centimeters were excluded from the baseline fitting. The intensity of the G peak is represented in the images. To determine the G peak intensity, the spectra were fitted to a Pseudo-Voigt peak shape at positions between 1500 and 1700 reciprocal centimeters provided that maximal full width at half maximum of 110 reciprocal centimeters and minimum intensity of 0 counts was present. The images were analyzed using ImageJ (https://imagej.nih.gov/ij/docs/intro.html) software.

As shown, in the image of the graphene sample produced by electrochemical expansion of graphite to graphene (FIG. 4a), flakes having an area larger than 15 square micrometers were consistently produced. Indeed, of the flakes that are resolved using this approach, at least 10% had an area larger than 15 square micrometers, for example, at least 15% or at least 20% had an area larger than 15 square micrometers. In some instances, at least 3% had an area larger than 100 square micrometers, for example, at least 5% or at least 8% had an area larger than 100 square micrometers.

Of the flakes that had an area larger than 15 square micrometers, the average area of the large flakes was between 100 and 1000 square micrometers, for example, between 150 and 700 square micrometers. The size of the flakes appears to be largely inherited from the dimensions of the graphite used as a starting material and introduced into apparatus 1 (FIG. 1).

In contrast, the image of GRAPHENEA RGO (FIG. 4b) does not appear to unambiguously include flakes having an area larger than 15 square micrometers. In a histogram of an image spanning 32500 square micrometers, a single flake having an area larger than 15 square micrometers was included. This single flake however may also be an artifact resulting from incomplete dispersion of the graphene oxide on the substrate. Regardless of whether this single flake is real or an artifact, the average area of the larger flakes is well below 20 square micrometers.

The image of the ELICARB GRAPHENE (FIG. 4c) does not show any flakes having an area larger than 15 square micrometers. This is fully consistent with the manufacturer's claim of a particle size in the 0.5 to 2.0 micrometer range.

The image of the expanded graphite L2136 (FIG. 4d) shows flakes having an area larger than 15 square micrometers. However, microscopy inspection indicates that these flakes are rather thick compared to graphene samples. Raman spectroscopy of the 2D band can be used to measure flake thickness, i.e., the average number of continuously AB stacked graphene layers. Details regarding the procedure for evaluating the Raman spectra of the materials in FIG. 4a-d to measure flake thickness are given below.

In Raman scattering, an indirect measure of the number of atomic layers is the peak symmetry of the 2D band. For example, in Phys. Rev. Lett. 2006, 97, 187401, it is described that an asymmetric shape of the Raman band around 2700 reciprocal centimeters indicates that flakes are thicker than 10 atomic layers and that mechanically exfoliated graphene displays asymmetric peak shapes even for flakes of two or more atomic layers. Although it is believed that a direct, statistical determination of the average number of atomic layers has yet to be developed, the symmetry of the 2D band is believed to be the most suitable technique for relative comparisons of the average number of atomic layers in different samples.

Peak "symmetry" can be quantified by a variety of different approaches. For example, the coefficient of determination for a Pseudo-Voigt peak fitting of a single peak is believed to be a relatively robust approach. For this purpose, a standardized procedure for preparing, fitting, and evaluating graphene Raman spectra has been developed and made available at https://github.com/graphenestandards/raman. For the evaluations below release v1.0 has been used and the permalink to the used script is https://github.com/graphenestandards/raman/blob/
5cb74ed87545082bd587e4319c061ea2c50e3a6f/DtoG-2Dsymetry.ipynb. Use of this script allows recorded Raman data to be evaluated in a transparent and uniform manner and allows comparisons between values obtained in different laboratories.

Raman spectroscopy of graphite and graphene also allows qualitative identification of structural and chemical defects in the two-dimensional crystal of carbon atoms. Such defects can be seen in the so called "defect" D peak at positions between 1280 and 1450 reciprocal centimeters and the "graphite" G peak at positions between 1560 and 1610 reciprocal centimeters. The G peak results from in-plane vibrations of sp2-bonded carbon atoms. The D peak results from out-of-plane vibrations. The underlying Raman scattering event requires a defect for momentum conservation and is attributable to structural and chemical defects. This D peak is absent from Raman spectra of defect-free graphite or graphene as a result of the conservation of momentum.

Researchers have attempted to quantitatively determine defect density from the ratio of the area of the D peak to the area of the G peak, for example, in Nano Lett. 11, p. 3190-3196 (2011) and Spectrosc. Eur. 27, p. 9-12 (2015). It is believed that the relationship is non-linear and a maximum exists for intermediate defect densities. A D/G peak intensity ratio below 0.5, together with a single, distinct 2D band is believed to indicate a low defect density, for example, below $1\times10^{11}$ defects per square centimeter. This evaluation, however, does not take effects like stress (e.g., from wrinkles) into account.

Even though the assignment of a defect density on an absolute scale is difficult (particularly for large flakes with a significant amount of mechanical deformation), a relative comparison of the D/G area ratio of different materials is straightforward and believed to be a good indication of material properties which depend on the defect ratio, including electrical and thermal conductivity. For example, a standardized procedure for preparing, fitting, and evaluating graphene Raman spectra has been developed and made available at https://github.com/graphenestandards/raman. For the evaluations below release v1.0 has been used. The permalink to the used script is https://github.com/graphenestandards/raman/blob/
5cb74ed87545082bd587e4319c061ea2c50e3a6f/DtoG-2Dsymetry.ipynb. Use of the script allows Raman data to be evaluated in a transparent and a uniform manner and allows comparisons of values obtained in different laboratories.

In further detail, Raman spectra are recorded using 532 nm laser excitation between 1260 and 2810 reciprocal centimeters and a spectral resolution better than 1.8 reciprocal centimeters. The excitation power is set to values that avoid excessive local heating, for example, below 2 mW in the focus of a 100× objective. The spectral range for D and G band evaluation is cut to between 1266 and 1750 reciprocal centimeters. A second order polynomial was fitted to the data, omitting the range of the D band between 1280 and 1450 reciprocal centimeters and the G band between 1480 and 1700 reciprocal centimeters. The result was subtracted from the data. Spectra with a signal-to-noise ratio (determined as the squared variance of the data divided by the squared variance of the residuals of the baseline fit) below 5000 were discarded, since it is believed that they do not allow for reliable evaluation of the peak.

It is believed to be necessary that more than 100 spectra should remain for sufficiently meaningful results to be obtained.

A first Pseudo-Voigt peak for the D band is fitted by a least-squares minimization to the baseline corrected data, with the center constrained between 1335 and 1360 reciprocal centimeters, the full width at half maximum constrained to 10 to 160 reciprocal centimeters, the Gaussian to Lorentzian fraction constrained to 0.01 to 1, and the amplitude constrained to positive values. A second Pseudo-Voigt peak for the G band is fitted by a least-squares minimization to the baseline corrected data, with the center constrained between 1560 and 1610 reciprocal centimeters, the full width at half maximum constrained to 10 to 240 reciprocal centimeters, the Gaussian to Lorentzian fraction constrained to 0.01 to 1, and the amplitude to positive values. The area of the resulting first Pseudo-Voigt peak is divided by the area of the second Pseudo-Voigt peak and the result is the respective D/G area ratio.

The procedure yields a value for the D/G area ratio, where, for example, values below 0.8, values below 0.5 or values below 0.2 are indications of a medium, low or very low defect density, respectively.

The spatially resolved Raman measurements shown in FIG. 4 were evaluated according to the procedure described above. The results for the D/G area ratios are show in TABLE 1.

TABLE 1

D/G area ratios of the materials from

| | Hydrogenated graphite layers 106 | De-hydrogenated graphite layers 116 (after a heat treatment of 30 minutes at 800° C. in $N_2$) | GRAPHENEA RGO | L2136 expanded graphite |
|---|---|---|---|---|
| D/G < 0.8 | 11.69% | 100.0% | 0.00% | 99.96% |
| D/G < 0.5 | 0.08% | 99.72% | 0.00% | 99.74% |
| D/G < 0.2 | 0.00% | 76.49% | 0.00% | 95.34% |
| Average D/G | 1.1 ± 0.2 | 0.17 ± 0.06 | 1.3 ± 0.1 | 0.07 ± 0.07 |

The material produced by electrochemical expansion and separation of individual flakes, corresponding to hydrogenated graphite layers 106 drop-cast from suspension 125 in FIG. 1a and dried at 300° C., displays a relatively high D/G area ratio, with less than 12% showing a D/G area ratio below 0.8 and an average value of 1.1±0.2. The average D/G area ratio of hydrogenated graphite layers 106 from suspension 125 may thus be lower than the average D/G area ratio of GRAPHENEA RGO, which yielded an average D/G area ratio of 1.3±0.1. Both average D/G area ratios are significantly higher than the value for expanded graphite L2136, which yielded an average D/G area ratio of 0.07±0.07.

These results are believed to indicate that the hydrogenated graphite layers 106 drop-cast from suspension 125 and dried at 300° C. and GRAPHENEA RGO have a higher structural or chemical defect density than the defect density of graphite L2136 and the defect density of dehydrogenated graphite layers 116. For example, the defect density of the flakes 106 in suspension 125 and GRAPHENEA RGO is believed to be higher than $1\times10^{11}$ defects per square centimeter or, for example, higher than $1\times10^{14}$ defects per square centimeter (Spectrosc. Eur. 2015, 27, 9-12).

Hydrogenated graphite layers 106 from suspension 125 can be converted to dehydrogenated graphite layers 116 by drop-casting hydrogenated graphite layers 106 on a wafer and thermally treating the same wafer at 800° C. for 30 minutes in nitrogen atmosphere at 2 mbar. After the thermal treatment, a D/G area ratio of 0.17±0.06 can be measured in a single location. This indicates that more than 50% of the defects in hydrogenated graphite layers 106 before the thermal de-hydrogenation were chemical defects associated with chemisorption of hydrogen. Hydrogen chemisorption is known to be reversible (Science 2009, 323, 610-613). In contrast, graphene oxide generally does not exhibit D/G area ratios below 0.5 even after thermal reduction at comparable temperatures (Adv. Mater. 2013, 25, 3583-3587). This is consistent with the measured D/G area ratio for GRAPHENEA RGO, which is reduced graphene oxide and still yielded a D/G area ratio larger than one.

On the other hand, these results are believed to indicate that the defect density of dehydrogenated graphite layers 116 is less than $1\times10^{11}$ defects per square centimeter, for example, less than $5\times10^{10}$ defects per square centimeter or less than $3\times10^{10}$ defects per square centimeter.

Further, although the defect density is quite low, some dehydrogenated graphite layers 116 retain characteristics that may be indicative of residual defects. For example, in some implementations, the full width half maximum of the G peak in μ-Raman spectra collected at 532 nm excitation with a resolution better than 1.8 reciprocal centimeters is larger than 20 reciprocal centimeters, for example larger than 25 reciprocal centimeters or larger than 30 reciprocal centimeters. As another example, in some implementations, the μ-Raman spectra of the de-hydrogenated graphite collected at 532 nm excitation with a resolution better than 1.8 reciprocal centimeters show a broad peak in the range between 1000 and 1800 reciprocal centimeters with a full width half maximum of more than 200 reciprocal centimeters, for example, more than 400 reciprocal centimeters.

In summary, a significant reduction of factor two or more of the Raman D/G area ratio can be obtained by thermal treatments of hydrogenated graphite layers such as hydrogenated graphite layers 106 at temperatures in excess of 300° C. The reductions in Raman area D/G area ratio are believed to be attributable to de-hydrogenation. The reduction in the Raman D/G area ratio can be, for example, by a factor of more than three, or, for example, by a factor of more than five. The reduction in Raman D/G area ratio is believed to be indicative of the production of a graphene with a low defect density. For example, in some implementations, more than 50% of the statistical spectra display a D/G area ratio below 0.8, for example more than 90% display a D/G area ratio below 0.8. In some implementations, 50% or more (e.g., more than 90%) display a D/G area ratio below 0.5. In some implementations, 20% or more (e.g., more than 50%) display a D/G area ratio below 0.2. The average D/G area ratio of at least 100 statistical spectra evaluated by the procedure described above in smaller than 0.8, for example, smaller than 0.5 or smaller than 0.2.

Along with probing the defect density, Raman scattering of graphene also provides an indirect measure of the number of atomic layers is using the peak symmetry of the 2D band. For example, in Phys. Rev. Lett. 2006, 97, 187401, it is described that an asymmetric shape of the Raman band around 2700 reciprocal centimeters indicates that flakes are thicker than 10 atomic layers and that mechanically exfoliated graphene displays asymmetric peak shapes even for flakes of two or more atomic layers. Although it is believed that a direct, statistical determination of the average number of atomic layers has yet to be developed, the symmetry of the 2D band is believed to be the most suitable technique for relative comparisons of the average number of atomic layers in different samples.

Peak "symmetry" can be quantified by a variety of different approaches. For example, the coefficient of determination for a Pseudo-Voigt peak fitting of a single peak is believed to be a relatively robust approach. For this purpose, a standardized procedure for preparing, fitting, and evaluating graphene Raman spectra has been developed and made available at https://github.com/graphenestandards/raman. For the evaluations below release v1.0 has been used and the permalink to the used script is https://github.com/graphenestandards/raman/blob/

5cb74ed87545082bd587e4319c061ea2c50e3a6f/DtoG-2Dsymetry.ipynb. Use of this script allows recorded Raman data to be evaluated in a transparent and uniform manner and allows comparisons between values obtained in different laboratories.

In further detail, Raman spectra are recorded using 532 nm laser excitation between 1260 and 2810 reciprocal centimeters and a spectral resolution better than 1.8 reciprocal centimeters. The spectral range for 2D band evaluation is cut to between 2555 and 2810 reciprocal centimeters. A linear baseline is subtracted by fitting a straight line to the data, while omitting the range of the 2D band between 2600 and 2790 reciprocal centimeters. The result is subtracted from the data. Spectra with a signal-to-noise ratio (determined as the squared variance of the data divided by the squared variance of the residuals of the baseline fit) below 5000 are discarded, since it is believed that they do not allow for reliable evaluation of the peak shape. It is believed to be necessary that more than 100 spectra should remain for sufficiently meaningful results to be obtained. A Pseudo-Voigt peak is fitted by a least-squares minimization to the baseline corrected data, with the center constrained between 2650 and 2750 reciprocal centimeters, the full width at half maximum constrained to 10 to 240 reciprocal centimeters, the Gaussian to Lorentzian fraction constrained to 0.01 to 1, and the amplitude to positive values. To limit the impact of detector noise, the fit residuals and the Raman intensity data are smoothed by calculating the running average of data between 2600 and 2790 reciprocal centimeters with a window of five datapoints after the fitting. From the obtained values, the coefficient of determination is calculated as the variance of the smoothed residuals divided by the variance of the smoothed Raman intensity data and subtracting the result from one.

This procedure yields the coefficient of determination of the 2D single peak fitting (2D $R^2$), which is believed to be a measure for the symmetry of the 2D Raman band of graphite and graphene. Values close to one are believed to indicate a high symmetry of the 2D band and lower values believed to indicate an increasing asymmetry of the 2D band.

If the evaluated graphite or graphene is has a D/G area ratio below 0.5, the symmetry of the 2D band is believed to be indicative of the average thickness of flakes. In this regard, defect-rich materials often display 2D peak asymmetry for very thin layers and even monolayers. On the other hand, sometimes an otherwise clear asymmetry of thicker layers is screened by the very large width of the 2D peak, which is typical for materials with a high D/G area ratio. For these reasons, the 2D band symmetry evaluation of the flake thickness was only applied for materials fulfilling the criterion of a D/G area ratio below 0.5. A high symmetry is believed to indicate a relative low number of AB stacked layers, for example, less than 10 layers, for example, less than five layers or even a single layer. An increasing layer number corresponds to decreasing values of the coefficient of determination of the 2D single peak fitting (2D $R^2$).

After de-hydrogenation, the D/G area ratio is below 0.5 and an evaluation of the 2D peak symmetry becomes possible. A Raman spectrum of the same location shown in FIG. 4a (i.e., after the thermal treatment at 800° C. for 30 minutes at 2 mbar in $N_2$) was measured and the coefficient of determination was derived using the procedure described above. The results are given in TABLE 2.

TABLE 2

Coefficient of Determination for a single Pseudo-Voigt peak fitting of the 2D peak

|  | Separated and dehydrogenated graphite layers 116 | L2136 expanded graphite | Unseparated dehydrogenated graphite layers 116 in >100 μm thick film | ELICARB GRAPHENE in >100 μm thick film | Expanded graphite L2136 in >100 μm thick film | Graphite before electrochemical expansion in >100 μm thick film |
|---|---|---|---|---|---|---|
| R2 > 0.980 | 97.97% | 1.11% | 76.58% | 88.79% | 0.85% | 7.44% |
| R2 > 0.990 | 88.4% | 0.00% | 61.26% | 43.10% | 0.00% | 0.00% |
| R2 > 0.995 | 67.83% | 0.00% | 45.05% | 0.00% | 0.00% | 0.00% |

For the separated and dehydrogenated graphite layers 116, more than 80% of the spectra displayed an $R^2$ better than 0.99, while flakes of expanded graphite L2136 displayed no spectra with an $R^2$ better than 0.99.

To help ensure that the samples of individual flakes were representative of the original composition of the materials, an additional procedure was used. A viscous suspension of the flakes in mesitylene was prepared. This suspension was spread on a glass carrier to form a black film of many stacked particles with an area of at least 1×1 $mm^2$. The area was smooth enough to allow for μ-Raman spectroscopy. Raman spectra were recorded using 532 nm laser excitation between 1260 and 2810 reciprocal centimeters and a spectral resolution better than 1.8 reciprocal centimeters. The excitation power was set to avoid excessive local heating, for example, below 5 mW using a 100× objective. One hundred and twenty one spectra were recorded on a 1×1 $mm^2$ area with a spacing of 0.1 mm. The resulting $R^2$ value are described above and given in TABLE 2. For the separated and dehydrogenated graphite layers 116 (800° C., 2 mbar, 30 minutes), more than 50% of the spectra displayed an $R^2$ larger than 0.99, for example, more than 60%, more than 80%, or more than 85% displayed an $R^2$ larger than 0.99. Indeed, for the separated and dehydrogenated graphite layers 116 (800° C., 2 mbar, 30 minutes), more than 40% of the spectra displayed an $R^2$ larger than 0.995, for example, more than 50%, or more than 65% displayed an $R^2$ larger than 0.995.

In the source graphite material (e.g., the graphite introduced into apparatus 1), more than 90% of the spectra had an $R^2$ smaller than 0.98 and no spectra had an $R^2$ larger than 0.99. More than 40% of the spectra taken of ELICARB graphene showed an $R^2$ better than 0.99, but no spectra had an $R^2$ better than 0.995. More than 10% of the spectra from both unseparated and separated dehydrogenated graphite layers 116 had an $R^2$ better than 0.995, for example more than 40%, or, for example, more than 60%.

Although the relationship between the 2D peak symmetry to the average thickness of AB stacked layers in the flakes is—at present—only qualitative, many researchers believe that asymmetry in the 2D peak arises due to more than one atomic layer of AB stacked graphite, for example more than 10 atomic layers of AB stacked graphite. Turbostratic stacking—that is stacking of flakes in a random orientation—does not appear to lead to peak asymmetry but rather to broadening of the 2D peak. Thus, it may not be possible to distinguish between single atomic-layer flakes and flakes with more than one, for example, more than 10 atomic layers if the stacking of those layers is turbostratic.

Many researchers also believe that more than 10 AB stacked layers results in clear asymmetry of the 2D band in Raman spectroscopy. FIG. 6 shows example 2D peak spectra of various samples. In particular, FIG. 6a shows spectroscopic data 605 and a least-square error fitted peak 610 for graphite suitable for use as a starting material in apparatus 1. FIG. 6b shows spectroscopic data 615 and a least-square error fitted peak 620 for ELICARB GRAPHENE. FIG. 6c shows spectroscopic data 625 and a least-square error fitted peak 630 for a first sample of separated and dehydrogenated graphite layers 116. FIG. 6d shows spectroscopic data 635 and a least-square error fitted peak 640 for a second sample of separated and dehydrogenated graphite layers 116.

These images illustrate that the $R^2$ thresholds of 0.98, 0.99 and 0.995 are capable of distinguishing between peaks with different symmetries. Based on these results, we estimate that 50% or more of the graphene produced by electrochemical expansion followed by heat treatment has fewer than 10 AB-stacked atomic layers, for example, more than 60% or more than 70% has fewer than ten AB-stacked atomic layers. Further, we also estimate that more than 10% of the graphene produced by electrochemical expansion followed by heat treatment is single-layer graphene, for example, more than 20% or more or 50%.

In contrast, we estimate that more than 90% of the source graphite material suitable for introduction into apparatus 1 has 10 or more AB-stacked layers. We also estimate that more than 90% of conventionally expanded graphite has more than 10 AB-stacked layers, for example more than 95% or more than 99%.

The hydrogenated and dehydrogenated graphite materials described herein can be used in semiconductor devices (e.g., in transistors). The graphite materials can also be used in display screens such a touch screens, solar cells, and in nanotechnological devices. The graphite materials can also be used as a component electrodes in supercapacitors and batteries, such as, e.g., lithium, lithium-compound, and non-lithium batteries. The graphite materials can also be used as conductive layers, e.g., as conductive transparent layers. The graphite materials can also be used in inks and paints, including functional inks and paints. The graphite materials can also be used in composites, for example, with polymers or metals, including applications as thermal interface materials or electromagnetic shielding.

A number of implementations have been described. Nevertheless, it will be understood that various modifications may be made. For example, a variety of different solvents and dispersants can be used. Polydisperse and inhomogeneous graphene samples can be treated to reduce polydispersity and/or improve homogeneity. For example, the distribution of sizes can be adjusted by filtering or centrifugation. The amount of hydrogenation can be adjusted by the conditions of the electrochemical reaction, for example, by adjusting the voltage used and the water content. The layer number distribution can be changed by sedimentation, centrifugation, or other techniques.

Figure 5:
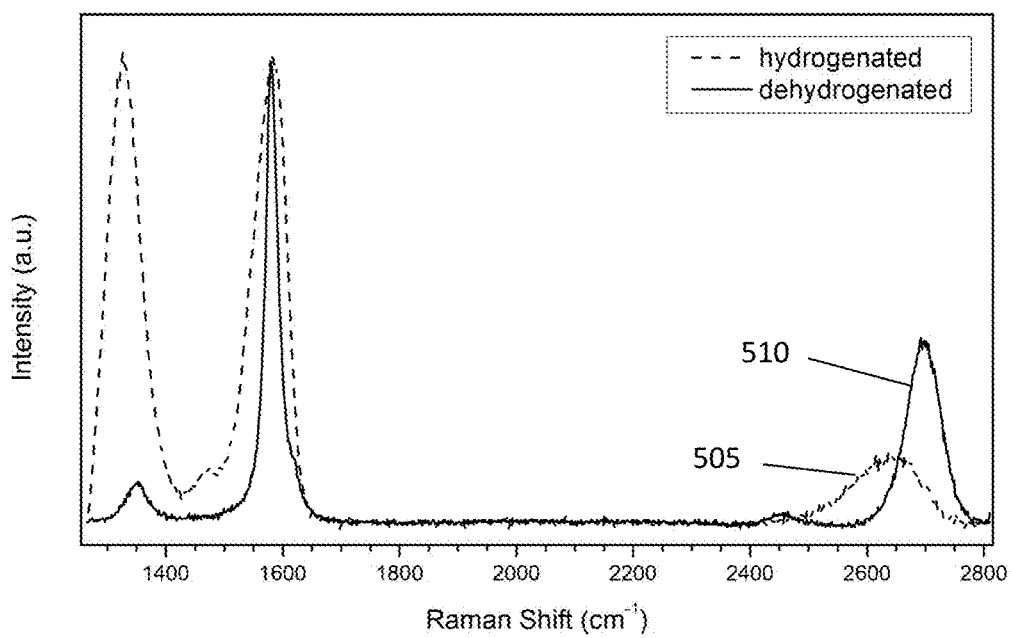
FIG. 5 is a graph of a pair of overlaid Raman spectra of hydrogenated graphite layers at a single location.

As another example, hydrogenated graphite layers can be dehydrogenated by photo treatment. For example, visible light, UV, and microwaves can all be used to drive the dehydrogenating of hydrogenated graphite layers, hence decreasing the D/G area ratio, which is believed to correspond to a decrease in the defect density. FIG. 5 is a graph of a pair of overlaid Raman spectra of hydrogenated graphite layers 106 of a single location after drop-casting from suspension 125 and drying at 300° C. In particular, spectrum 505 was collected prior to and spectrum 510 was collected after laser irradiation at around 25 mW at the focus of a 100× objective for a few seconds under atmospheric conditions. As shown, the D/G area ratio decreases by more than a factor of five. This indicates a conversion of hydrogenated graphite layers 106 to dehydrogenated graphite layers 116.

Accordingly, other implementations are within the scope of the following claims.

What is claimed is:

1. A method for the expansion of the graphite to graphene, wherein graphite particles and at least one electrolyte are introduced into at least one container and the graphite, through the application of an electrical voltage to at least one anode and at least one cathode is expanded, wherein the cathode contains or consists of diamond and hydrogen is produced at the cathode.

2. Method according to claim 1, wherein hydrogen is intercalated in the graphite particles or chemisorbed on the graphite particles, so that graphene flakes are exfoliated from the graphite particles.

3. Method according to claim 1, wherein the anode is separated from the cathode by a separator.

4. Method according to claim 3, wherein the separator contains or consists of one or more of diamond, polytetrafluoroethylene, Al2O3, ceramic, quartz, or glass.

5. Method according to claim 3, wherein the separator, or both the separator and the anode, are set into rotation.

6. Method according to claim 1, wherein an electrical voltage from about 5 V to about 60 V is applied between the anode and cathode.

7. Method according to any claim 1, further comprising the step of photo-treating the graphene flakes for dehydrogenation, wherein more that 50% of hydrogenated sp3 hybridized carbon sites are de-hydrogenated.

8. Method according to claim 1, further comprising the step of subsequent thermal treatment of the graphene flakes at a temperature from about 100° C. to about 800° C. and for a period of from about 1 min to about 60 min.

9. Method according to claim 1, wherein the graphene flakes have an average surface area of more than 10 um2.

* * * * *

UNITED STATES PATENT AND TRADEMARK OFFICE
CERTIFICATE OF CORRECTION

PATENT NO. : 10,662,537 B2
APPLICATION NO. : 15/642086
DATED : May 26, 2020
INVENTOR(S) : René Hoffmann, Christoph E. Nebel and Sarah Roscher Page 1 of 1

It is certified that error appears in the above-identified patent and that said Letters Patent is hereby corrected as shown below:

On the Title Page

Item [71], delete "FÖDERUNG" and insert -- FÖRDERUNG --, therefor.

In the Claims

Claim 7, Column 22, Line 52, after "to" delete "any".

Signed and Sealed this
Fourteenth Day of July, 2020

Andrei Iancu
*Director of the United States Patent and Trademark Office*